(12) United States Patent
Wang et al.

(10) Patent No.: US 6,990,113 B1
(45) Date of Patent: Jan. 24, 2006

(54) ADAPTIVE-WEIGHTED PACKET SCHEDULER FOR SUPPORTING PREMIUM SERVICE IN A COMMUNICATIONS NETWORK

(75) Inventors: Haining Wang, Ann Arbor, MI (US); Chia Shen, Arlington, MA (US)

(73) Assignee: Mitsubishi Electric Research Labs., Inc., Cambridge, MA (US)

( * ) Notice: Subject to any disclaimer, the term of this patent is extended or adjusted under 35 U.S.C. 154(b) by 963 days.

(21) Appl. No.: 09/658,694

(22) Filed: Sep. 8, 2000

(51) Int. Cl.
*H04L 12/54* (2006.01)

(52) U.S. Cl. .................. 370/412; 370/429; 370/401; 370/468

(58) Field of Classification Search ............. 370/252, 370/400, 401, 412, 413–418, 429, 468; 709/223–226
See application file for complete search history.

(56) References Cited

U.S. PATENT DOCUMENTS

| | | | |
|---|---|---|---|
| 5,377,327 A * | 12/1994 | Jain et al. ............ | 709/235 |
| 5,936,958 A * | 8/1999 | Soumiya et al. ....... | 370/395.43 |
| 6,055,564 A | 4/2000 | Phaal .................. | 709/207 |
| 6,094,435 A | 7/2000 | Hoffman et al. ........ | 370/414 |
| 6,324,165 B1 * | 11/2001 | Fan et al. ............ | 370/232 |
| 6,353,616 B1 * | 3/2002 | Elwalid et al. ........ | 370/443 |
| 6,408,005 B1 * | 6/2002 | Fan et al. ............ | 370/412 |
| 6,556,578 B1 * | 4/2003 | Silberschatz et al. ... | 370/412 |
| 6,625,161 B1 * | 9/2003 | Su et al. ............. | 370/415 |
| 6,675,220 B1 * | 1/2004 | Bergamasco et al. ..... | 709/232 |

FOREIGN PATENT DOCUMENTS

| | | |
|---|---|---|
| EP | 0 901 301 A2 | 3/1999 |
| WO | WO 97/14240 | 4/1997 |

OTHER PUBLICATIONS

Jacobson et al., "An Expedited Forwarding PHB"; Dated Feb., 1999. Internet Engineering Task Force, Differentiated Services Working Group, Internet Draft, Expires Aug., 1999. www.ietf.org.

Malis, et al. "Protocol for support of asynchronous transfer mode (ATM) Service class aware multiprotocol labes switching (MPLS) traffic engineering," Vivace Networks, Mar. 2003.

Guerin, et al., "Aggregating RSVP-based requests," Internet Engineering Task Force, Nov. 1997.

* cited by examiner

*Primary Examiner*—Ricky Ngo
*Assistant Examiner*—Duc Duong
(74) *Attorney, Agent, or Firm*—Dirk Beinkman; Andrew J. Curtin

(57) ABSTRACT

A method schedules packets in a router of a packet-switched network. The network has a set of service classes including a premium service, an assured service, and a best-effort service. The router includes one queue for each service class. Each queue stores packets to be transmitted according to the associated service class. The method measures an exponential weighted moving average queue length of the queue associated with the premium service each time a packet is stored in that queue. Bandwidth is increased if the average increases over a minimum threshold. The bandwidth remains below an upper limit once the average reaches a maximum threshold.

11 Claims, 5 Drawing Sheets

ADAPTIVE-WEIGHTED PACKET SCHEDULER FOR SUPPORTING PREMIUM SERVICE IN A COMMUNICATIONS NETWORK

FIELD OF THE INVENTION

This invention relates generally to communications networks, and more particularly, to enhancing service in a packet switched network.

BACKGROUND OF THE INVENTION

In the absence of quality-of-service (QoS) measures, best-effort service is the default behavior of packet-switched networks. Routers in the network make a best effort to deliver a packet, but may drop packets indiscriminately in the event of network congestion. The routers managing bandwidth and prioritize delay-sensitive packets. The Internet today is a good example of best-effort service. Best-effort is suitable for a wide range of networked applications such as general file transfers or e-mail.

However, there are many functions which are considered relatively more important or urgent than others. For example, in some applications involving the world-wide web (the "web"), it might be considered more important to receive and process commercial transactions than to permit browsing of certain types of information. Functions can also be considered relatively more important or urgent dependent on context. For example, a processing resource becomes overloaded. In such a case, it may be desired to give certain packets priority. For real-time streaming applications, such as audio/video deliver, jitter is a concern.

Jitter is distortion of a signal as it is propagated through the network, where the signal varies from its original reference timing, and packets do not arrive at a destination in consecutive order or on a timely basis, i.e., the packets vary in latency. In packet-switched networks, jitter is a distortion of the interpacket arrival times compared to the interpacket times of the original transmission. Also referred to as delay variance. This distortion is particularly damaging to multimedia traffic.

Therefore, many network, such as the Internet define a concept called quality of service (QoS). QoS is set of actions the network takes to configure and signal according to a particular traffic classification. QoS collectively measures the level of service delivered. QoS can be characterized by several basic performance criteria, including availability, error performance, response time and throughput, lost calls or transmissions due to network congestion, connection set-up time, and speed of fault detection and correction. Internet Service Providers ISPs) may guarantee a particular level of QoS, defined by a service level agreement (SLA). QoS solutions sort and classify packet requests into different traffic classes and allocates the proper resources to direct traffic based on various criteria including application type, user or application ID, source or destination IP address, time of day, and other user-specified variables.

In order to provide end-to-end quality-of-service in the Internet, the Internet Engineering Task Force (IETF) has defined two major architectures for augmenting best-effort service, namely, Integrated Services (IntServ), and Differentiated Services (DiffServ).

In the network data plane of the IntServ architecture, scheduling schemes such as Weighted Fair Queuing (WFQ), Virtual Clock (VC) and Rate-Controlled Earliest Deadline First (RC-EDF) have been proposed to support guaranteed service. In the control plane, a signaling protocol called a Resource ReSerVation Protocol (RSVP) is required to perform admission control and resource reservation. While IntServ provides excellent quality of service, it requires per-flow management at core routers, which places an unbearable burden on core routers.

Due to the poor scalability of the IntServ architecture, DiffServ has been proposed as an alternative architecture. DiffServ is an IETF standard utilizing a small, well-defined set of per-packet building blocks from which a variety of services may be built to provide a framework for delivering quality of service (QoS) in networks. At least two service classes have been defined under this effort, "Assured Service" and "Preferred Service."

DiffServ can provide expedited handling appropriate for a wide class of applications, including lower delay for mission-critical applications and packet voice applications. DiffServ-capable routers need only to track a small number of per-hop behaviors, and the routers service packets based on a single byte. Typically, DiffServ is associated with a coarse level of packet classification.

In the network data plane of the DiffServ, per-flow state management at core routers are eliminated. Based on bit patterns of the differentiated service (DS) field in the IP header, IP flows are classified into different aggregates.

A core router merely implements simple scheduling and buffering mechanisms to serve the aggregated flows. In other words, the services are provided for aggregates, instead of individual flows, and defined by a small set of Per-Hop Behaviors (PHBs).

Per Hop Behavior is the forwarding treatment given to a specific class of traffic, based on criteria defined in the DS. Routers and switches use PHBs to determine priorities for servicing various traffic flows. A PHB group is a set of one or more PHBs that can only be meaningfully specified and implemented simultaneously, due to a common constraint applying to all PHBs in the set such as a queue servicing or queue management policy. A PHB group provides a service building block that allows a set of related forwarding behaviors to be specified together, e.g., four dropping priorities.

By pushing the complexity to edge routers, DiffServ's data plane is much more scalable than IntServ. While DiffServ is more scalable, it still requires the support of admission control, resource provisioning, and service-level agreement on the control plane.

A bandwidth broker architecture has been proposed to perform admission control and resource provisioning in each network domain. A bandwidth broker is a traffic manager deployed at congestion points, such as routers, that limits access to network resources. The bandwidth broker decouples QoS control from core routers. Core routers do not maintain any QoS reservation state, all reservation states are stored and managed by bandwidth brokers. However, a bandwidth broker cannot coordinate multiple traffic flows or resolve conflicting QoS requests made by multiple domains, and is therefore not an end-to-end QoS solution.

For the packet scheduling discipline in the data plane, a number of mechanisms are available to implement the coarse-grain QoS support. Besides priority queuing and weighted round robin scheduler, a Class Based Queuing (CBQ) scheduler is a possible implementation to meet the requirements of forwarding behaviors in DiffServ architecture, in which the EF queue is given the priority up to the configured rate.

Currently, three types of PHBs are included in DiffServ architecture, which are Expedited Forwarding (EF) PHB.

Assured Forwarding (AF) PHB, and Best-Effort (BE) PHB. The EF is to support premium service in DiffServ, which has been proposed as a virtual leased line. Providing low loss rate, low delay, low delay jitter and assured throughput are the commitments made by premium service. AF only provides low loss rate, but no guarantee on delay and delay jitter.

To implement premium service in IP networks, a packet scheduler at a router is essential to meet the EF commitments. Among the various proposed packet-scheduling schemes, priority queuing and weighted round robin have attracted attention to realize EF due to their simplicity. Results have shown that priority queuing can provide lower delay, and lower delay jitter to a EF flow than weighted round robin does. This result is no surprise, because in priority queuing scheduler, the priority queue is always serviced before any other queue so that a timely packet delivery is guaranteed.

However, priority queuing can introduce larger burstiness because the EF packets do not get interleaved with any other packets that belong to a different behavior aggregate (BA). A behavior aggregate is a set of packets with the same DS field pattern in a forwarding path.

The aggregation of EF flows leads to cluster of EF packets, and the EF burstiness increases as more EF flows aggregate at core routers. These side effects brought by priority queuing can cause the EF packet arrival rate to exceed the reserved service rate at core routers, resulting in packet losses.

It is also known that priority queuing can lead to increased burstiness and bursty packet loss. Moreover, priority queuing allows exhaustive bandwidth consumption by EF flows, which can cause starvation to other behavior aggregates. The weighted round robin, or weighted fair queuing scheduling scheme does not have such drawbacks, but the traffic distortion inside the network and the dynamic flow aggregation make the static weights hard to work well at routers.

To provide for no, or very small queuing delay, the premium service requires that the maximum arrival rate of the EF aggregate at every transit node is always less than the aggregate's minimum departure rate. There are two prerequisites to meet this requirement: the EF aggregate has a well-defined minimum departure rate, which is independent of the dynamic state of the router; and the EF aggregate is conditioned, which includes policing and shaping, to ensure that its arrival rate at any router is less than the router's configured minimum departure rate.

Unfortunately, traffic conditioning is only performed at edge routers. Traffic distortion inside the network such as packets clustering could violate the promised traffic specification easily. Furthermore, in each router, the number of flows in EF aggregates changes with the joining or leaving of individual EF flows, so the minimum departure rate for EF aggregate should be dynamically adjusted to meet the change of traffic profile. Without the support of rigid admission control and accurate traffic conditioning, the static setting of weights could cause bursty packet losses because a relatively small buffer space is used for premium service.

Therefore, there is a need for a packet scheduler that supports premium service in a communications network. The scheduler should dynamically adapt to different traffic flow aggregates, without requiring rigid admission control. Burstiness in the network should be absorbed without packet loss or increased queuing delays.

SUMMARY OF THE INVENTION

This invention provides a method for scheduling packet deliver for premium service in a differentiated services architecture network. The method can use weighted packet scheduling policies, such as, weighted round robin or fair queuing. As an object of the invention, the present scheduling method adaptively changes the scheduling weights of behavior aggregates, instead of adhering to certain fixed values as in the prior art. By adaptively adjusting the weights with the dynamics of the average queue size of premium service, the method according to the invention achieves low packet loss rate, low delay and low delay jitter for the premium service.

In addition, the present method is flexible, and does not require rigid admission control and accurate traffic conditioning to support premium service in a differentiated service architecture. Transient burstiness of expedited forwarding aggregate, which is caused by the traffic distortion inside the network, can be absorbed without packet loss and increased queuing delay.

The method according to the invention uses a buffer to accommodate transient burstiness for premium service. The method uses exponential weight moving average (EWMA) to estimate an average queue size for premium service, which is the index used for calibrating the weights. The weight of premium service is adaptively adjusted, according to the dynamics of average queue size.

By maintaining a very small average queue size, low queuing delay is achieved. Also, a small queue weight is used to reduce the fluctuation of instant queue size, leading to low delay jitter. To provide different forwarding services, in DiffServ architecture each Behavior Aggregate has its own buffer space at core routers, instead of a commonly shared buffer.

More particularly, a method schedules packets in a router of a packet-switched network. The network has a set of service classes including a premium service, an assured service, and a best-effort service. The router includes one queue for each service class. Each queue stores packets to be transmitted according to the associated service class. The method measures an exponential weighted moving average queue length of the queue associated with the premium service each time a packet is stored in that queue. Bandwidth is increased if the average increases over a minimum threshold. The bandwidth remains below an upper limit once the average reaches a maximum threshold.

DETAILED DESCRIPTION OF THE PREFERRED EMBODIMENT

Figure 1:
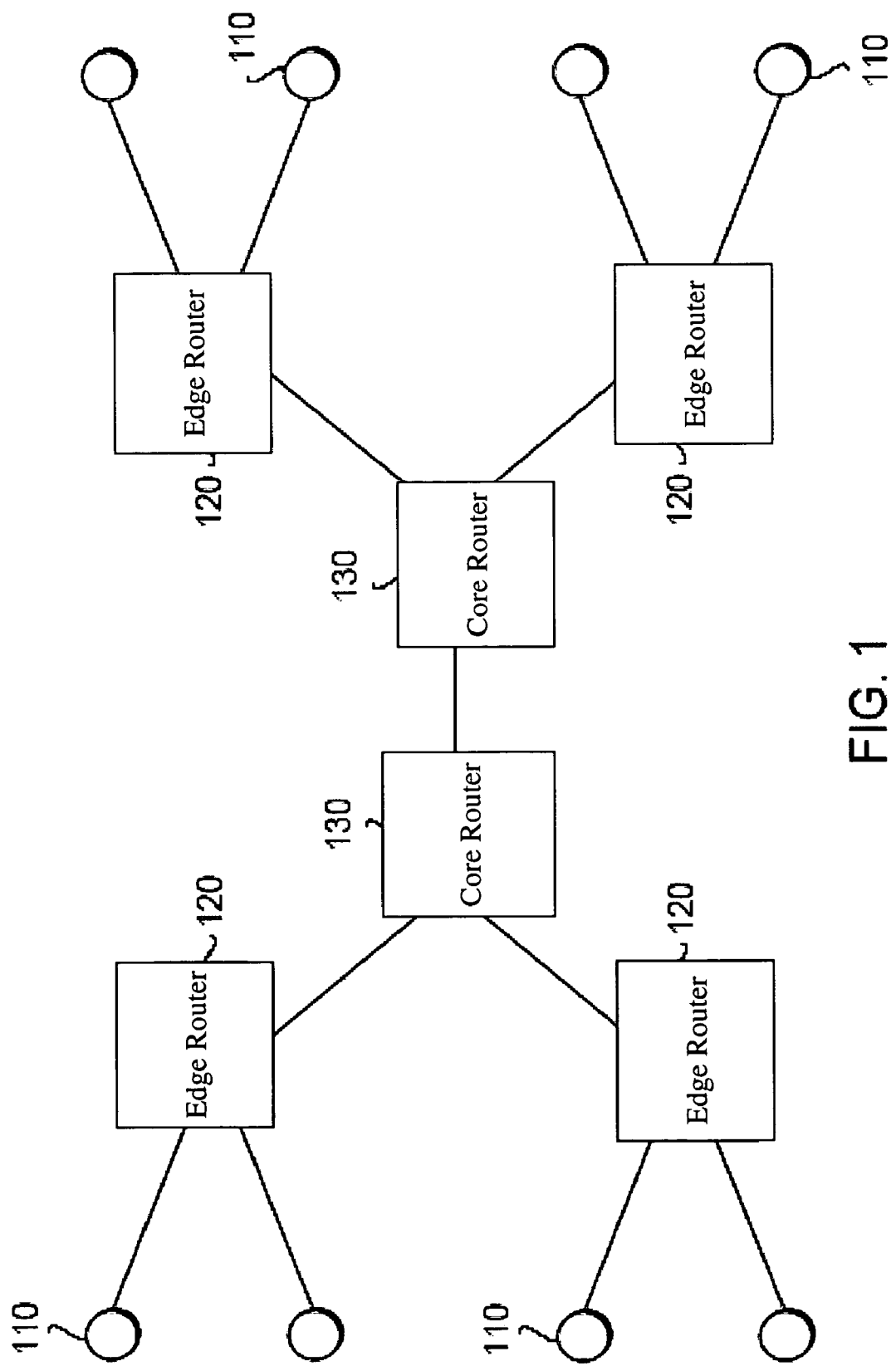
FIG. 1 is a block diagram of a packet-switched network that uses the scheduler according to the invention.

FIG. 1 shows a packet-switched communications network that uses our invention. The network includes a number of host computers 110 that can transmit and receive messages (packets). Routers of the network process the packets. Edge routers (ER) 120 are connected to the host computers 110, and core routers (CR) 130 connect routers to each other inside the network.

Figure 2:
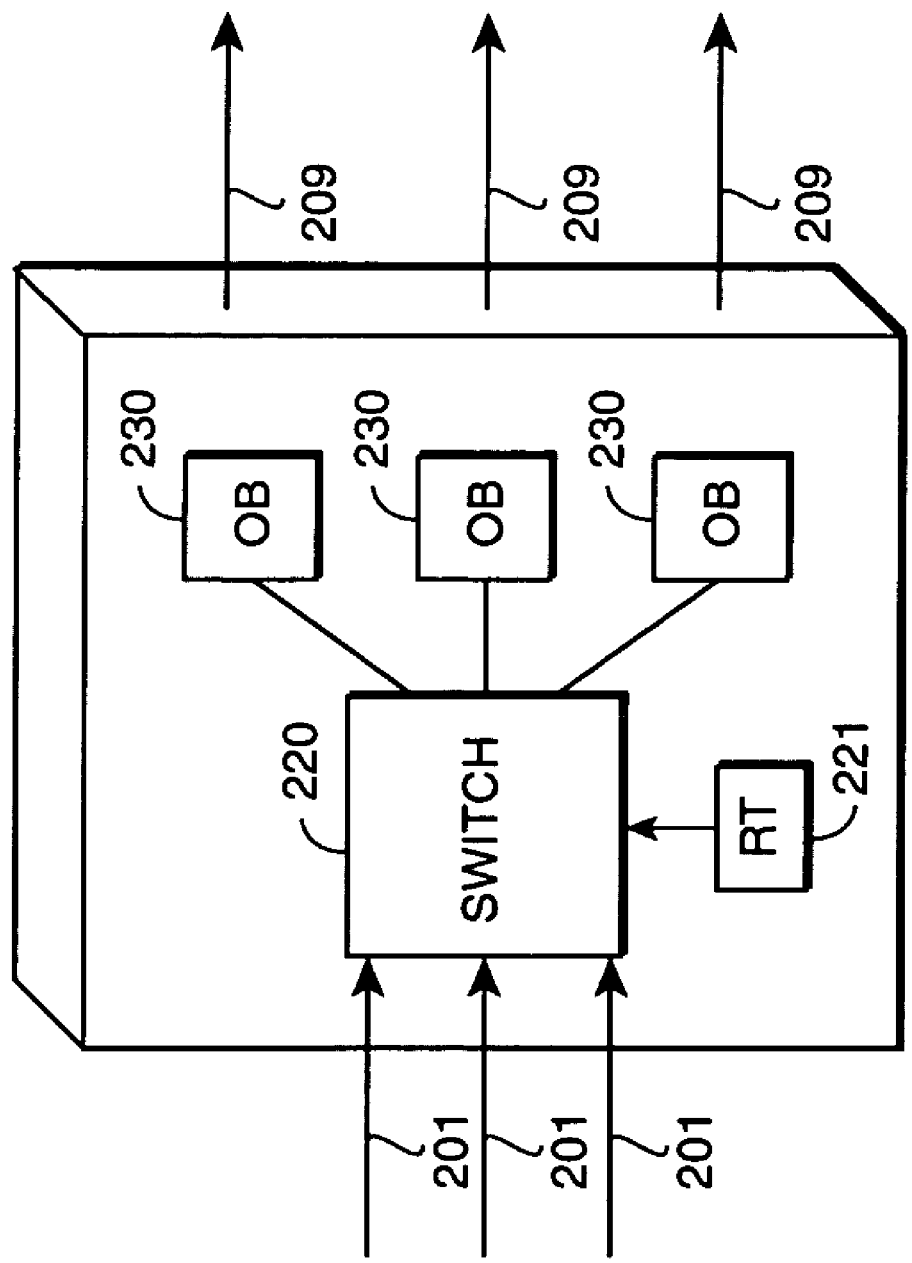
FIG. 2 is a block diagram of a router of the network of FIG. 1.

FIG. 2 shows a router. The router connects input lines 201 at input ports to a switch 220. The switch 220 uses a routing table 221 to route packets to output buffers 230 at output ports connected to output lines 206.

Figure 3:
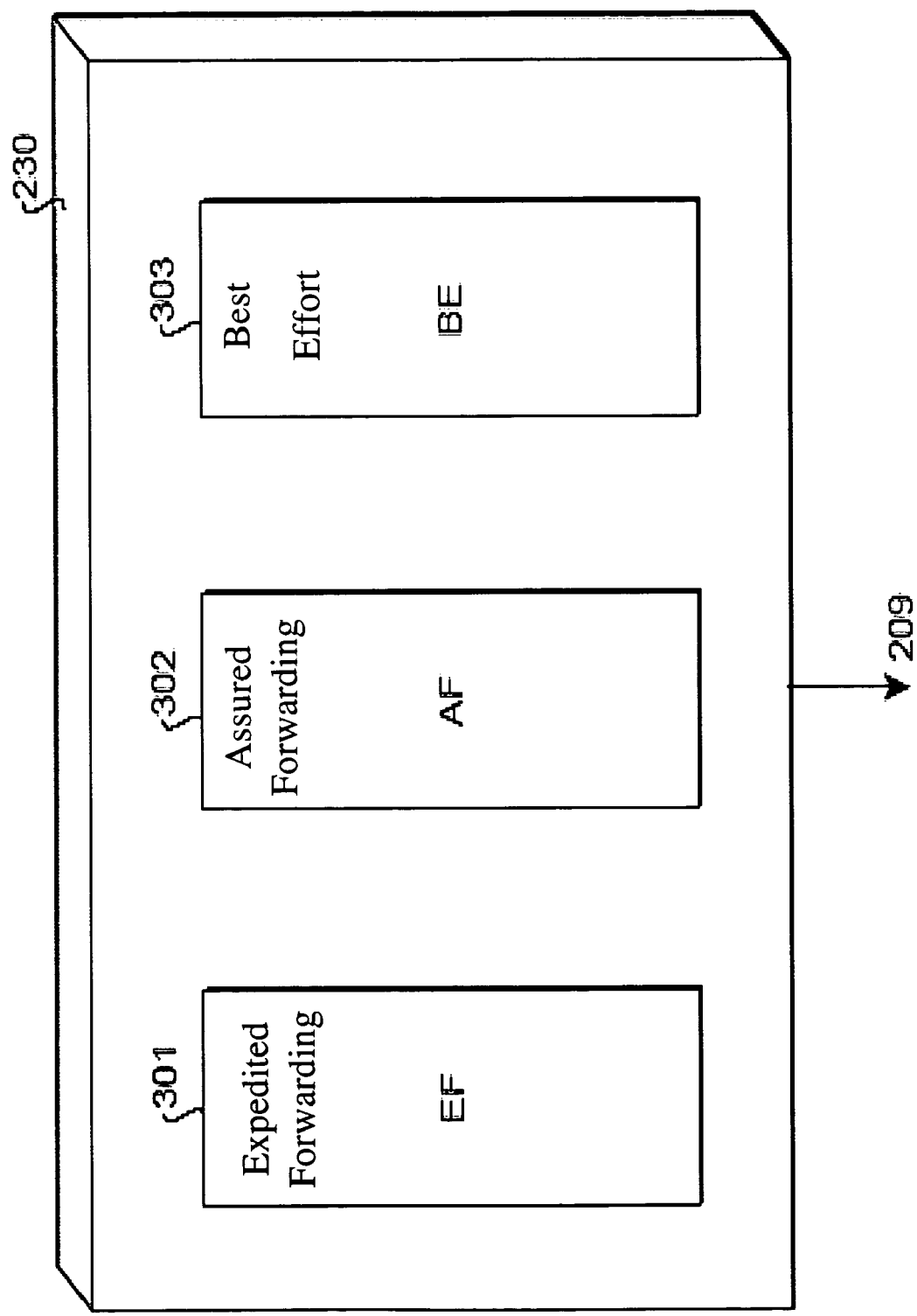
FIG. 3 is a block diagram of an output buffer of the router of FIG. 2 including three queues.

FIG. 3 shows one of the output buffers 230. Each buffer includes three queues. An EF queue 301 stores premium service packets, an AF queue 302 stores assured service packets, and a BE queue 303 stores best-effort packets. It should be understood, that other types of packet-switched network may include a different set of services, and hence a different number of queues.

Each queue has a size s that indicates the maximum number of packets that can be stored in the queue, and a length l that indicates the current number of packets stored in the queue. The size s is static, while the length l varies over time.

Packets are delivered to the corresponding output line 209 according to a bandwidth-weighted formulation:

$$EF_w + AF_w + BE_w = 1,$$

where $EF_w$, is the weight of premium service, $AF_w$, is the weight of assured service, and $BE_w$, is the weight of best-effort. That is, the weights determine the relative amount of bandwidth on the output line that is allocated to packets in the corresponding queues. If the weight associated with the EF queue is high, for example, then premium service packets are allocated more bandwidth and given preferential service.

Figure 4:
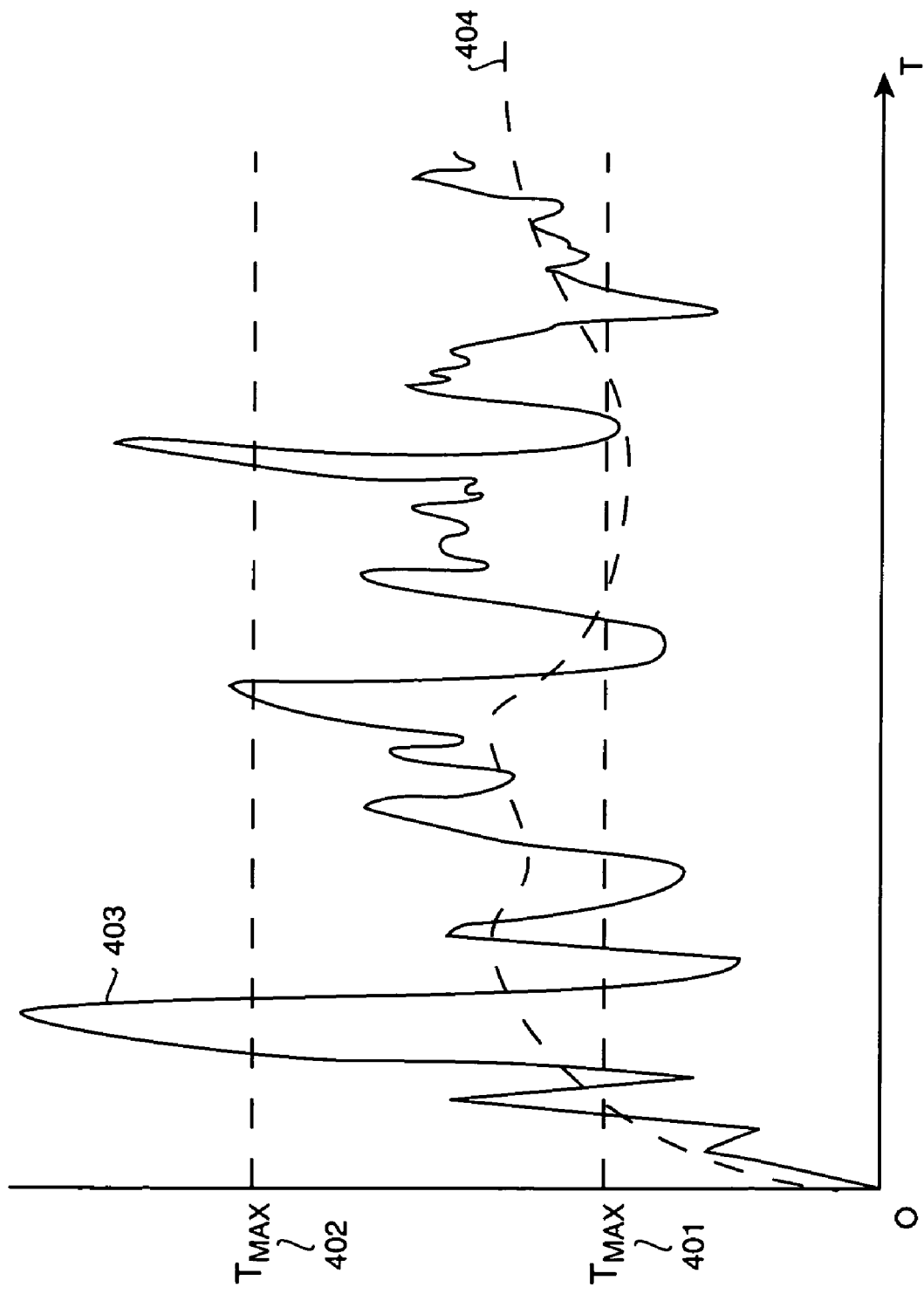
FIG. 4 is a graph of average queue length over time.

FIG. 4 shows the dynamic behavior of the EF queue 301 over time. The x-axis indicates time (T), and the y-axis indicates a current number of packets stored in the EF queue 301. The curve 403 shows the instantaneous queue length l over time, and curve 404 the average queue length.

To adaptively calibrate the weight $EF_w$, of premium service according to the invention, a minimum threshold ($T_{min}$) 401 and a maximum threshold ($T_{max}$) 402 are provided. The minimum threshold represents a desired delay, the maximum threshold ($T_{max}$) represents an acceptable delay. The delay corresponds to the number of packets that are currently stored in the queue. That is, the longer the queue, the longer the delay before a packet is transmitted.

Our invention provides an adaptive-weighted method for scheduling packets in the communications network. Our scheduling method is elastic to traffic distortion and the dynamics of flow aggregation in the network. Our method can be applied to both weighted round robin and fair queuing schemes.

ADAPTIVE WEIGHT CALIBRATION

Figure 5:
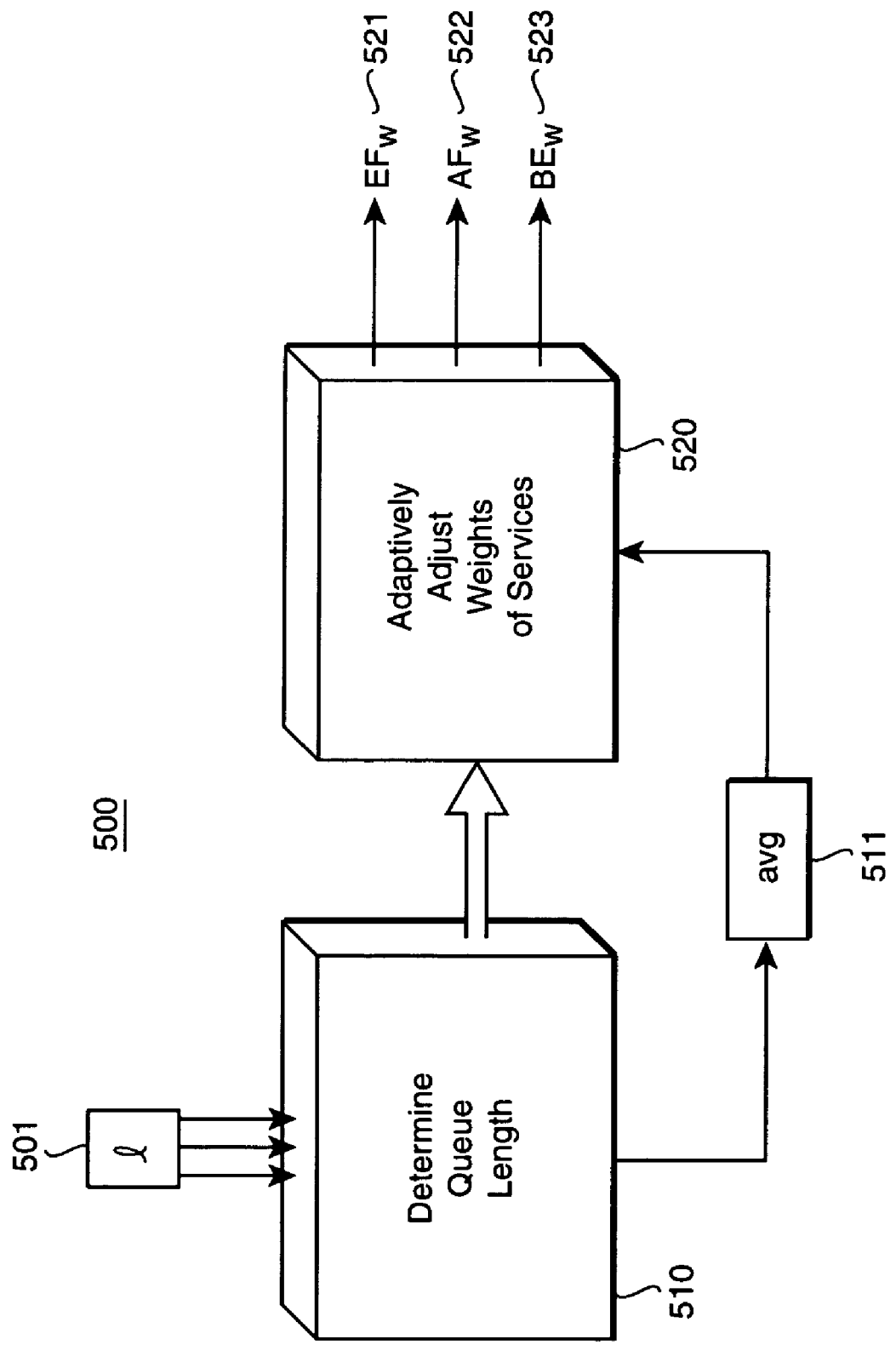
FIG. 5 is a flow diagram of a method for scheduling according to the invention.

As shown in FIG. 5, our method 500 determines 510 an average queue length (avg) 511 of the premium service queue 301. This average length is used as an index to adaptively adjust the weights $EF_w$ 521, $AF_w$ 522, and $BE_w$, 523 in step 520. The average is recomputed every time a packet is stored in the queue 301.

The average queue length avg of the premium service queue 301 is determined using a low-pass filter $f_i$ with an exponential weighted moving average. The purpose of the low-pass filter is to dampen oscillations in the average as the queue length changes rapidly in response to varying network condition.

If avg 511 is the average queue length, and l 501 is the instantaneous queue length, and $f_i$ is the low-pass filter, the determination of the average queue length is determined by:

$$avg \leftarrow (1-f_l) \cdot avg + f_l \cdot 1.$$

To reduce fluctuations in the average queue length, the low-pass filter $f_l$ is set to 0.01. This results in low delay jitter.

Low queuing delay can be achieved by keeping the average queue length avg below the maximum threshold $T_{max}$. To accomplish this, the weight of premium service ($EF_w$) 521 is increased whenever the average queue length exceeds the minimum threshold $T_{min}$ 401.

However, the weight of premium service is not allowed to exceed a predetermined upper limit (upper), when the average queue length reaches the maximum threshold $T_{max}$ 402. This avoids degrading the method to simple priority queuing, which can lead to packet clustering as described above.

In our method, the relationship between the weight of premium service and the average queue size is linear. If the original weight of premium service is $w_p$, then a weight function of premium service $EF_w$ 521, as a function of avg, can be expressed as:

$$EF_w = \begin{cases} w_p, & avg \in [0, 0.5) \\ \dfrac{(\text{upper} - w_p) \cdot (avg - T_{min})}{T_{max} - T_{min}} & avg \in [0.5, 2) \\ \text{upper}, & avg \in [2, s) \end{cases}$$

If the whole weight is 1, then $EF_w + AF_w + BE_w = 1$, where $EF_w$, is the weight of premium service, $AF_w$ is the weight of assured service, and $BE_w$, is the weight of best-effort.

We set the upper limit (upper of $EF_w$ to 0.7, the rest of the weight (0.3) is used by assured service and best-effort service. Because the whole weight for the shared link is fixed, the increase of weight of premium service leads to the same amount of decrease of the weight of best-effort, or the weight of assured service.

We apply the following rules. We first transfer some of the weight of best-effort to premium service. If the weight of premium service does not reach its upper limit, then part of the weight of assured service is transferred to premium service. After the average queue size of premium service decreases below $T_{max}$, the weights taken from best-effort or assured service is returned correspondingly.

In order to meet the commitment of no or very small queuing delay for premium service, we set the minimum threshold $T_{min}$ to 0.5 and the maximum threshold $T_{max}$ to 2, as measured in packets.

Our adaptive-weighted scheduling method for premium service in DiffServ adaptively changes the scheduling weights of behavior aggregates with the dynamics of average queue size of premium service. Our method absorbs traffic distortion inside a network without degrading delay or jitter. Moreover, our method does not require rigid admission control and accurate traffic conditioning to support premium service in DiffServ architecture.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. A method for scheduling packets in a router of a packet-switched network having a plurality of service classes, the router including one queue for each service class, each queue storing packets to be transmitted according to the associated service class, comprising:

measuring an average queue length for a particular one of the queues every time one packet is stored in the particular queue, wherein the particular queue includes a minimum threshold and a maximum threshold, the maximum threshold representing a desired transmission delay, and the maximum threshold representing an acceptable transmission delay; and allocating bandwidth to each of the plurality of service classes according to the average queue length.

2. The method of claim 1 wherein the plurality of services classes include a premium service, an assured service, and a best-effort service, and wherein the particular queue is associated with the premium service class.

3. The method of claim 1 wherein the average is an exponential weighted moving average.

4. The method of claim 3 further comprising:
applying a low-pass filter to the exponential weighted moving average.

5. The method of claim 1 wherein avg is the average queue length, and l is an instantaneous queue length, and $f_l$ is a low-pass filter, and wherein the average queue length is determined by $avg \leftarrow (1-f_l) \cdot avg + f_l \cdot l$.

6. The method of claim 5 wherein $f_l$ is 0.01.

7. The method of claim 1 wherein bandwidth for the service class associated with the particular queue is increased when the average exceeds the minimum threshold.

8. The method of claim 7 wherein the bandwidth allocated to the service class remains below a predetermined upper limit when the average exceeds the maximum threshold.

9. The method of claim 1 wherein the plurality of services classes include a premium service EF, and wherein the particular queue is associated with the premium service class, and wherein the particular queue includes a minimum threshold $T_{min}$ and a maximum threshold $T_{max}$, the maximum threshold representing a desired transmission delay, and the maximum threshold representing an acceptable transmission delay, and wherein avg is the average queue length, and l is an instantaneous queue length, and $f_l$ is a low-pass filter, and wherein an initial weight of bandwidth for the premium service is $w_p$, and an allocated bandwidth weight $EF_w$, of the premium service, as a function of avg is $$EF_w = \begin{cases} w_p, & avg \in [0, 0.5) \\ \dfrac{(upper - w_p) \cdot (avg - T_{min})}{T_{max} - T_{min}} & avg \in [0.5, 2) \\ upper, & avg \in [2, s) \end{cases}$$

where upper represents a predetermined upper limit when the average exceeds the maximum threshold, and s is a size of the particular queue measured in packets.

10. The method of claim 9 where upper is 0.7.

11. A method for scheduling packets in a router of a packet-switched network having a plurality of service classes, the router including one queue for each service class, each queue storing packets to be transmitted according to the associated service class, comprising:

measuring an exponential weighted moving average queue length for a particular one of the queues every time one packet is stored in the particular queue; and allocating more bandwidth to the service class associated with the particular queue if the average exceeds a predetermined minimum thresholds wherein the particular queue includes a minimum threshold and a maximum threshold, the maximum threshold representing a desired transmission delay, and the maximum threshold representing an acceptable transmission delay.

* * * * *